(12) United States Patent
Thorson et al.

(10) Patent No.: US 7,413,354 B1
(45) Date of Patent: Aug. 19, 2008

(54) OPTOELECTRIC POWER SOURCE FOR AN OPTICAL NETWORK

(75) Inventors: Kevin J. Thorson, Eagan, MN (US); Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/197,642

(22) Filed: Aug. 4, 2005

(51) Int. Cl.
*G02B 6/36* (2006.01)
(52) U.S. Cl. .......................................... 385/89; 385/88
(58) Field of Classification Search .................. 385/33, 385/36, 59, 60, 71, 72, 88–94
See application file for complete search history.

(56) References Cited

U.S. PATENT DOCUMENTS

| | | | |
|---|---|---|---|
| 2003/0142914 A1* | 7/2003 | Jewell et al. | 385/49 |
| 2004/0105629 A1 | 6/2004 | Cheng et al. | |
| 2004/0120659 A1* | 6/2004 | Cheng et al. | 385/89 |
| 2004/0247250 A1 | 12/2004 | Lee | |
| 2006/0140544 A1* | 6/2006 | Morimoto et al. | 385/59 |

* cited by examiner

*Primary Examiner*—Sung H Pak
(74) *Attorney, Agent, or Firm*—Brooks, Cameron & Huebsch, PLLC

(57) ABSTRACT

A ferrule embodiment includes a ferrule having a number of optical fibers each having an end and an optoelectric power source to convert light traveling through at least one of the optical fibers into electricity to provide power to a component.

18 Claims, 7 Drawing Sheets

OPTOELECTRIC POWER SOURCE FOR AN OPTICAL NETWORK

FIELD OF THE INVENTION

The present disclosure generally relates to creating optical connections between sections of optical fiber to form optical pathways. And, in particular, the present disclosure relates to providing power using components of optical networks.

BACKGROUND

In optical fiber communications, optical fibers are often constructed from a number of sections each having an optical pathway formed therein. The sections are aligned end to end such that light passing through a first optical pathway section can continue traveling through the optical pathway of a second optical fiber section.

In theory, the ends are placed adjacent to each other and the light passes from one end to the next. However, in the field, the environment of the optical network can provide forces that move one optical fiber section with respect to another and, thereby, the transmission of light signals between the optical fiber sections can be attenuated or disrupted.

As such, typically, at least the ends of two adjacent optical fiber sections are attached to each other to help maintain the alignment of the optical pathway with respect to the two optical fiber sections. Connectors have been proposed that act to connect an end of one optical fiber section to an end of another optical fiber section. These connectors are generally referred to as ferrules.

Ferrules typically aid in strengthening and maintaining the alignment of the connection between the first and second optical fiber sections through use of a rigid or semi-rigid body structure. The added rigidity can be provided by shape or size of the body, or by the materials used to manufacture the ferrule. Further, ferrules are often designed to permanently or releasably attach to each other to stabilize the interface between the two optical path sections.

In some optical networks, components such as one or more lenses, mirrors, filters, and the like, may be used to change the light signal being transmitted through an optical pathway. Some components use electricity to accomplish their particular tasks. In order to utilize such components, electricity has to be provided to the location of the electrical component. This is accomplished through the routing of electrical wires from an electrical source to the electrical component.

The routing of these wires can be accomplished by running the wires from above ground directly to the location or by running the wires generally parallel to optical pathways, for example. In some networks, the electrical wires can be attached to the ferrule or incorporated into the ferrule structure such that each optical pathway section also includes an electrical connection section that connects one wire section to another to form an electrical connection. However, these designs include wires that add to the complexity of the network, may be broken during installation or in the field, and provide additional connections between network sections that have to be made.

SUMMARY

Embodiments of the present disclosure include various ferrule, optical pathway, and optoelectric power source embodiments for use in an optical network. In various ferrule embodiments, for example, the ferrule includes a number of optical fibers each having an end. The ferrule also includes an optoelectric power source to convert light, traveling through at least one of the optical fibers, into electricity to provide power to a component.

The optical fibers can be used for the communication of signals through an optical pathway formed by the optical fiber, and/or can be used to provide light that can be converted into power (e.g., electricity). For instance a twelve fiber optical network can have four fibers dedicated to provide light to the optoelectric power source, while the remaining eight carry communication signals. However, any number of fibers can be used in an optical network and any number of fibers can be used to provide light for power conversion.

In some embodiments, a portion of the light carrying communications signals can be diverted to provide the light used by the optoelectric power source. This can be accomplished, for example, through use of one or more diverter (e.g., splitter) and/or mirrors. In some embodiments, light that is deflected at a splice point between two optical fiber sections can be harvested to be used by the optoelectric power source. In such embodiments, the light is already being diverted and receivers can be positioned to receive the diverted light.

An optoelectric power source can be positioned in various locations with respect to an optical fiber. For example, the optoelectric power source can be placed in the optical pathway, such as between the ends of two optical fiber sections, such that it receives light from at least one of the ends of the optical fibers, or a diverter can be used to divert light to the optoelectric power source.

Optoelectric power sources can be designed in various manners to accomplish the conversion of light into power. For example, the optoelectric power source can include a number of prisms and/or mirrors that can be used to direct light to a number of photo-voltaic pads (i.e., targets). The photo-voltaic pads can then direct the electrical signals to the one or more electrical components that are to use the power generated.

Optical networks can include various types of electrical components that can be powered by such optoelectric power sources. For example, sensors, filters mirrors and other components can include electrical elements that may use the generated electricity. For instance, some components have moving parts such as mirrors that are moved from a first position to a second position.

In some embodiments, these electrical components can be provided within a ferrule structure. Electrical components can also be provided in other ferrules and/or in structures independent of a ferrule.

In various optical pathway embodiments, the optical pathway can include a first ferrule having a number of optical fibers each having an end. The pathway also can include a first optoelectric power source to convert light traveling through at least one of the optical fibers into electricity to provide power to one or more components and a first engagement surface.

In such embodiments, a first ferrule can then be positioned with respect to a second ferrule formed around at least a portion of a number of second optical fibers. The positioning can be accomplished, for example, by having a second ferrule that includes a second engagement surface such that the first and second engagement surfaces can be positioned to allow for the transmission of light signals between the number of first optical fibers and the number of second optical fibers.

In some embodiments, the optoelectric power source can be constructed to receive light from either or both of the first and second numbers of optical fibers. This can be accomplished, for example, through use of one or more movable mirrors and/or prisms or by having a photo-voltaic material that can receive light from multiple directions. In such examples, it may be the case that the optoelectric power source has components that use power to perform functions, such as the movement and/or the placement elements like mirrors and/or prisms to receive light or to direct light.

And, in such embodiments, the optoelectric power source can be designed such that light is converted to provide the power to accomplish the functions of moving components in order to accomplish the redirecting of more light to power the optoelectric power source and/or other components. For example, the optoelectric power source can be designed to direct a portion of light used for signal communication, or light deflected at a splice, for powering the optoelectric power source and/or positioning of components. In this way, a small amount of light can be used to provide power to the optoelectric components so that they can be positioned or otherwise operated to affect the redirection of a larger amount of light to power other devices.

The electrical components can be positioned in various positions within the optical network and the delivery of the power from the optoelectric power source to the electrical components can be accomplished through circuitry and/or wiring. For example, if the electrical component is located proximate to the optoelectric power source, circuitry may be a suitable delivery mechanism. Circuitry such as a micro-electromechanical system (MEMS) component can be used to accomplish delivery in some embodiments.

The present disclosure also includes a number of optoelectric power source embodiments. For example, various optoelectric power source embodiments include a receiver component to receive light from an optical fiber, a target to receive the light from the receiver component, and an optoelectric converter to convert the light received by the target into electricity. A receiver can, for example, be a component such as one or more prisms and/or mirrors. A target can be used to receive light and can be made from various materials such as silicon, gallium arsenide, and other suitable materials. In some embodiments, the function of converting the light into electricity can be accomplished by the target.

DETAILED DESCRIPTION

The present disclosure includes a number of ferrule, optical pathway, and optoelectric power source embodiments. Embodiments of the present disclosure will now be described in relation to the accompanying drawings, which will at least assist in illustrating features of various embodiments.

Figure 1:
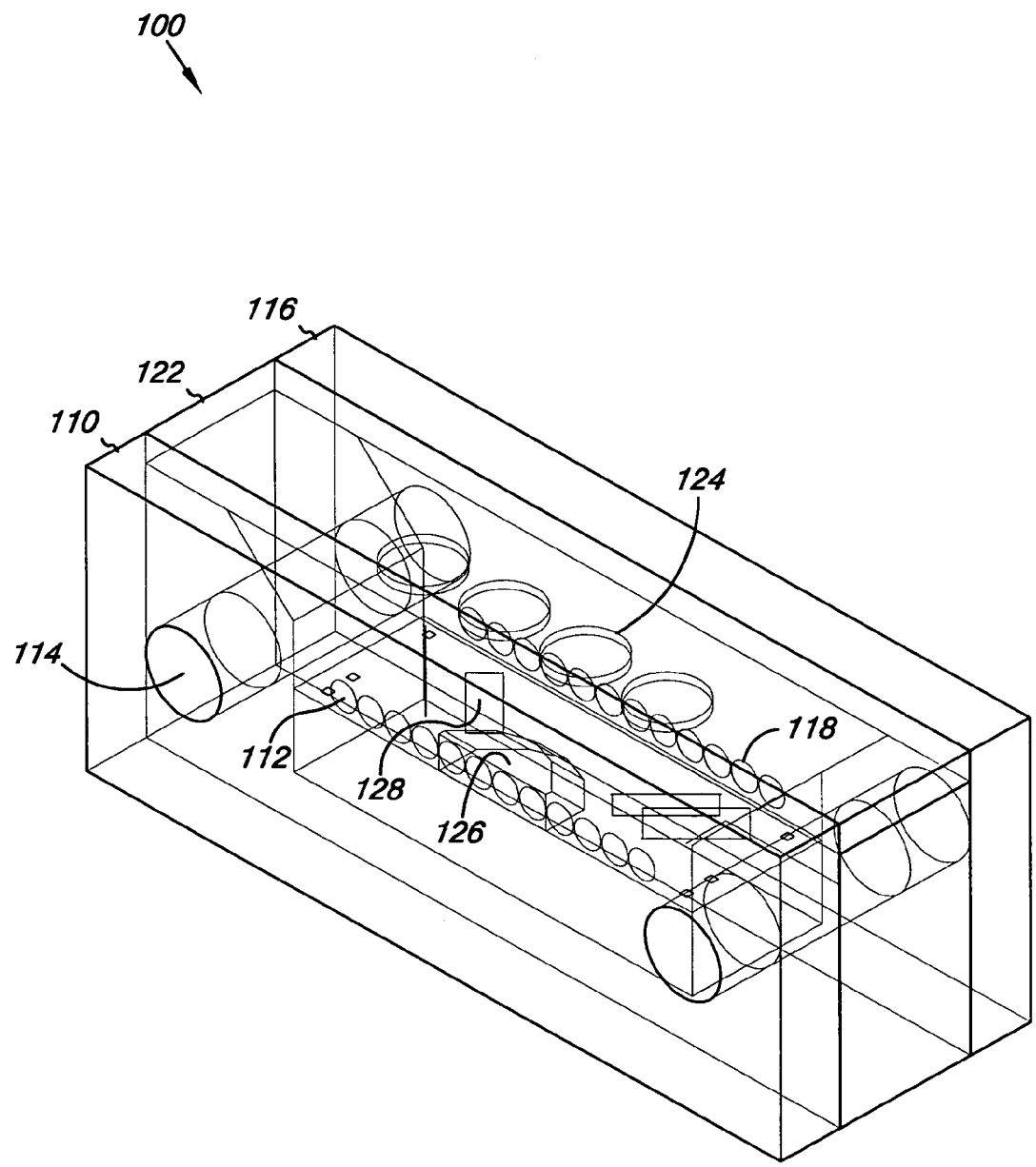
FIG. 1 is an illustration of an embodiment of an optoelectric power source of the present disclosure.

FIG. 1 is an illustration of an embodiment of an optoelectric power source of the present disclosure. In the embodiment of FIG. 1, the optoelectric power source 100 generally has three sections, with a first section 116, a second section 122, and a third section 110.

Although the embodiment includes three sections, the components can be provided in any number of sections. Three section embodiments can allow for some of the components to be replaced or serviced without disturbing the other components of the power source which can be beneficial, in some situations.

In this embodiment, the three sections can be aligned through use of alignment structures 114, among other methods. Such structures are described in more detail below with respect to FIGS. 2A-3A, and 4.

The first section 116 can include a number of apertures 118 for the placement of the ends of a number of optical fibers therein. In such embodiments, the optoelectric power source 100 can be used as a ferrule to connect the ends of two sets of optical fibers together to form a number of optical pathways.

The second section 122 includes the optoelectric components used to convert light into power, which will be described in more detail in the figures to follow. The third section 110 can include optics 112, such as lenses and filters, for changing the characteristics of the light passing through the optoelectric power source 100.

In some embodiments, the first section 116 can include optics, such as lenses, in addition to or instead of apertures for the placement of optical fibers. The same can also be said for the third section 110, where apertures for placement optical fibers can be provided with or instead of optics. Further, in some embodiments, the optoelectric power source 100 can be just the second section 122 having the optoelectric components therein, as will be described in more detail below.

Embodiments, such as that shown in FIG. 1, can be used as a ferrule wherein the ends of two sets of optical fibers are connected together to form a number of optical pathways. This can be accomplished by using two optoelectrical power source components 100 or by providing apertures at 118 for placement of a first set of optical fibers and apertures at 112 for placement of a second set of optical fibers.

In the embodiment illustrated in FIG. 1, the second section 122 includes a number of optoelectric components and a number of electrical components. Specifically, the embodiment has optoelectric components including a prism 126 and a number of photo-voltaic pads 124. The facets of the prism can be utilized for the redirection of light, while the photovoltaic pads 124 can be utilized for the receipt of light from a number of optical fibers positioned in apertures 118.

In some embodiments, one or more mirrors and/or multiple prisms can provide the functionality of prism 126. Additionally, in some embodiments, movable elements, such as mirrors and/or prisms can be provided to allow the movement of components to redirect light to move into and out a path of light.

With respect to the electrical components, the second section 122 includes a number of electrical optical components, in this case, mirrors 128 that reflect light back into the optical fibers positioned in apertures 118. By reflecting light, the optical pathway section provided by the optical fibers positioned in the apertures 118 can be used to test a portion of the pathway.

Testing can be used to provide intensity, wavelength, frequency, and other such information. The mirrors 128 illustrated in the embodiment of FIG. 1 can be movable, in some embodiments, from a laying down position to an upright position (shown).

In the laying down position, the mirrors are not positioned in an optical pathway. This allows light to pass through the optical pathway without being redirected. In this way, the mirrors can be selectively used to accomplish testing functions, for example, such as by redirecting light back down the same optical pathway in which it had been traveling, or by redirecting the light into a different optical pathway.

In such embodiments, a sensor can be placed at the opposite end of the optical pathway section, for example, and can receive the reflected light. The light can, for example, be tested to determine the length of an optical pathway, the position of the mirror, intensity of the light, whether wavelengths have been filtered out, and other such testing functions.

Figure 2A:
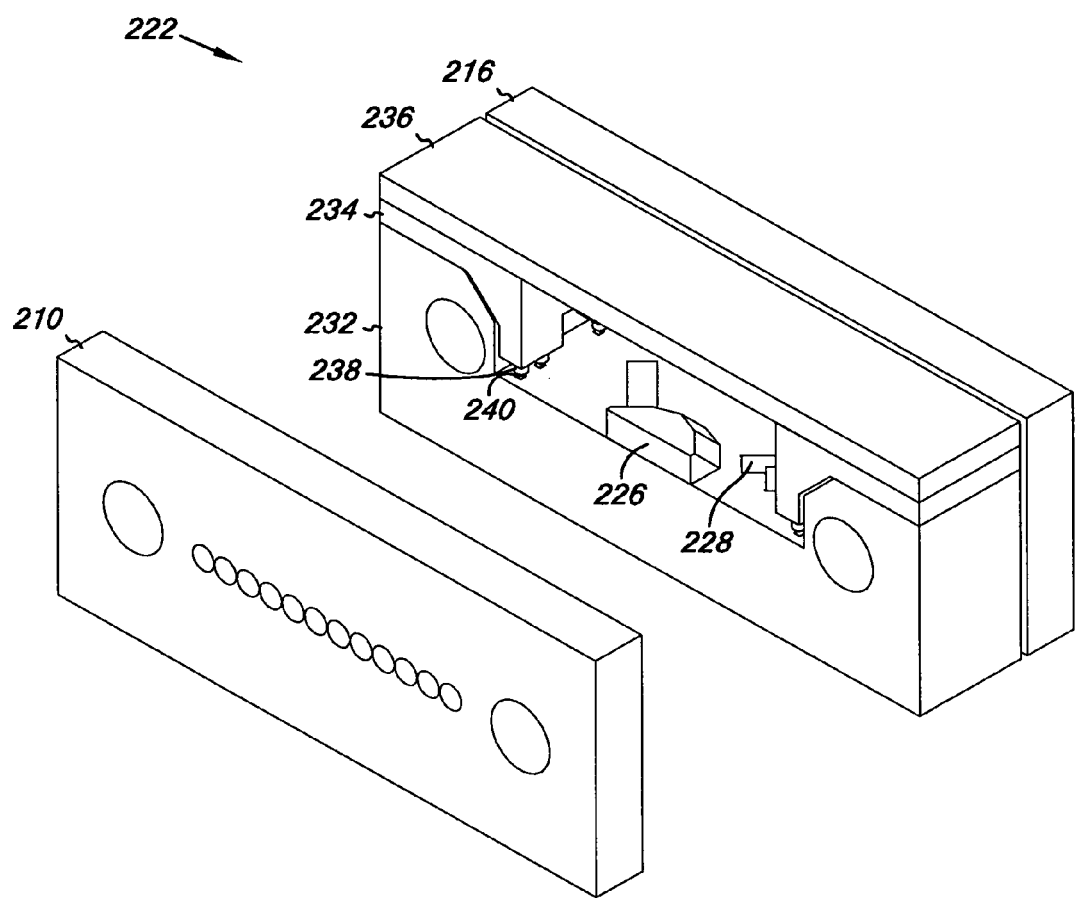
FIG. 2A is an illustration of another embodiment of an optoelectric power source of the present disclosure.

FIG. 2A is an illustration of another embodiment of an optoelectric power source of the present disclosure. This embodiment is similar to that shown in FIG. 1 and has had the third section 210 moved away from the second section 222 and first section 216 to provide a better view of the components of the second section 222.

However, the embodiment of FIG. 2A includes a spring loaded power connection that provides some tolerance for movement of the various components of the optoelectric power source with respect to each other. Such embodiments can be beneficial, for example, when used in moving vehicles, such as aircraft, watercraft, or landcraft, in which the optoelectric power source may endure a variety of forces and where forces in multiple directions may be encountered.

In this embodiment, a bottom housing 232 includes circuitry to route electricity to one or more electrical components. For example, in this embodiment, a number of electrically actuated mirrors 228 are provided.

The electricity from the optoelectrical components is transferred to these components 228. This can be accomplished through use of circuitry (e.g., MEMS) provided within housing 232. One end of the circuitry is provided at 240 in FIG. 2A.

In the embodiment shown in FIG. 2A, the circuitry 240 is connected to a conductive pin 238 which will be described in more detail in FIGS. 2B and 2C. In this embodiment, the pins 238 are positioned within an intermediate housing 234 which also houses a number of springs (shown in more detail in FIG. 2C).

In such embodiments, the springs, pins, and housing are designed such that the springs are compressed to cushion the interaction between the end of the pin 238 and the circuitry 240. The loading or compression of the springs is maintained by the placement of an upper housing 236 on top of the intermediate housing 234 which applies force to the pins 238.

Figure 2B:
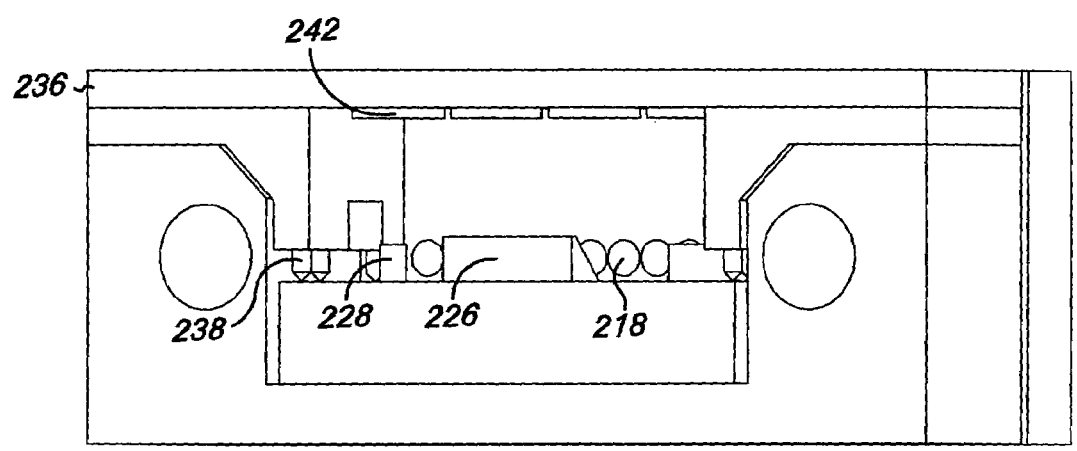
FIG. 2B is a view of the interior of the optoelectric power source of the embodiment of FIG. 2A.

The upper housing 236 can also provide a position for the placement for a number of photo-voltaic receivers (shown in more detail in FIGS. 1 and 2B). The photovoltaic receivers are positioned to receive light redirected from an element such as prism 226, as will be discussed in more detail below. Circuitry can also be provided in the upper housing 236 to connect the photo-voltaic receivers with the pins 238.

FIG. 2B is a view of the interior of the optoelectric power source of the embodiment of FIG. 2A. In this illustration, the photo-voltaic receivers 242 are positioned on the surface of the upper housing 236. In this way, light can be redirected by the prism 226 from an optical fiber positioned in one or more apertures 218 to one of the photo-voltaic receivers 242.

In the embodiment illustrated in FIG. 2B four photo-voltaic receivers 242 are provided. However, various embodiments can have more or less receivers and the receivers can be of various sizes and shapes.

In such embodiments, the light redirected light is then converted by the photo-voltaic receivers 242 and/or associated circuitry. The converted power is then transferred through the pins 238 to the electrical components (e.g., mirrors 228).

Figure 2C:
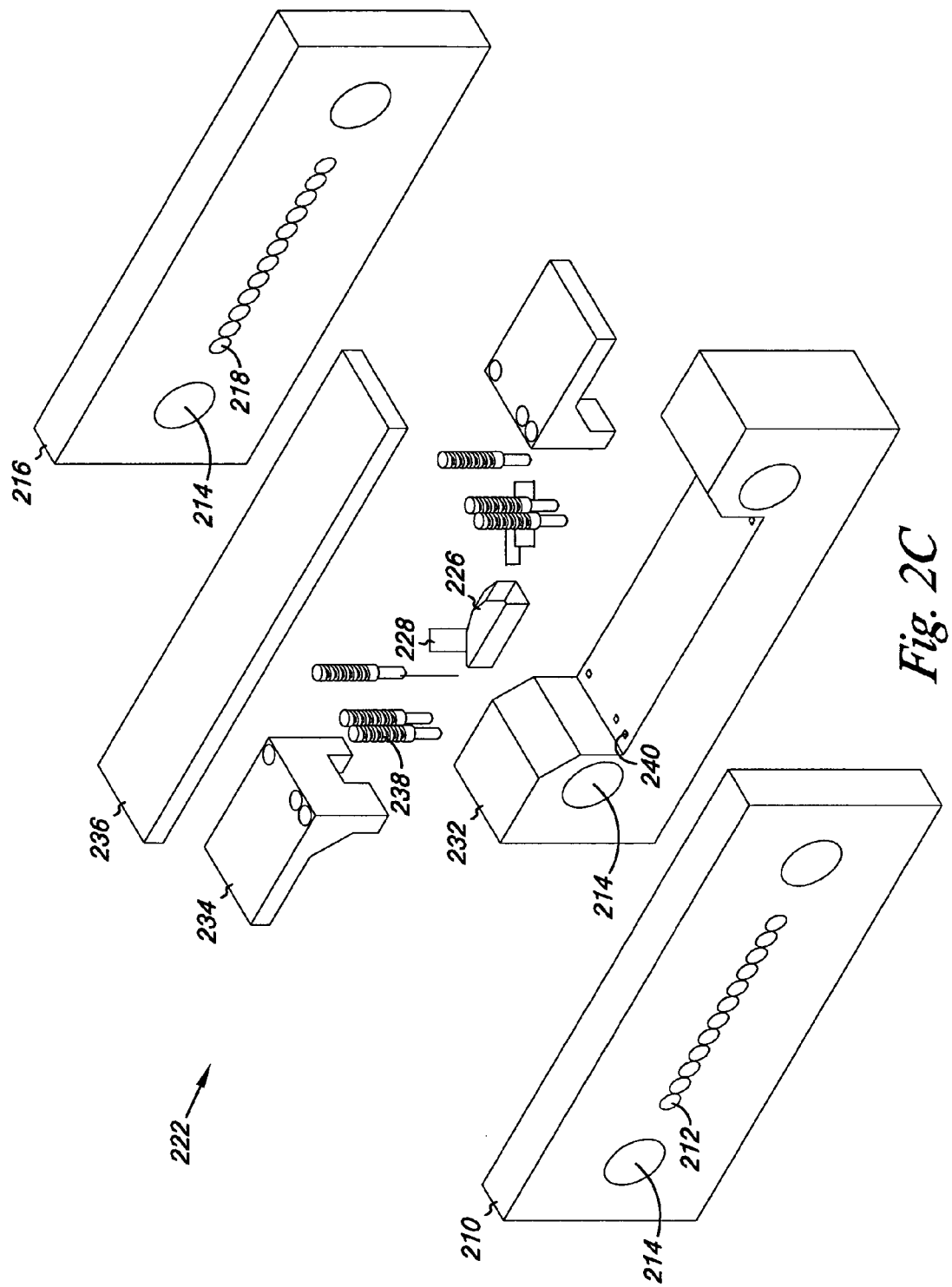
FIG. 2C is an exploded top perspective illustration of the embodiment of FIG. 2A.

FIG. 2C is an exploded top perspective illustration of the embodiment of FIG. 2A. In this illustration, the components of the optoelectric power source are shown in some detail to further describe the components of such embodiments. In FIG. 2C, the optoelectric power source generally includes a first section 216, a second section 222, and a third section 210. The first and third sections 216 and 210 can include a number of lenses and/or apertures (212 and 218) as discussed above with respect to components 112 and 118 of the embodiment of FIG. 1.

In some embodiments, one or more of the sections can include a number of source alignment structures 214 for alignment of the sections and/or alignment of the component with other components of the optical network. For example, when used with an independent ferrule, the optoelectric source can be aligned with the ferrule through use of a number of alignment pins that are positioned within apertures 214 and corresponding apertures provided in the ferrule body. Examples of such alignment with other components are shown and described in more detail with respect to FIGS. 3A and 4.

The second section 222 includes a number of pins 238 and springs (in the embodiment illustrated, the springs are shown around the exterior surfaces of the pins). In this embodiment, the springs and pins 238 are to be positioned in apertures formed in intermediate housing 234. The tips of the pins 238 are to be positioned to provide an electrical connection with the circuitry 240 provided on the lower housing 232. The lower housing 232, in the illustrated embodiment, also provides a surface for the mounting of optoelectrical and electrical components, such as prism 226 and mirrors 228.

As stated above, the upper housing 236 can be used to provide force to maintain a loaded condition on the springs surrounding the pins 238. The upper housing 236 can also include circuitry for routing electricity, from a number of photo-voltaic receivers, to the pins 238.

In some embodiments, such as that shown in FIG. 2B, the surface of the upper housing 236 can include a number of photo-voltaic receivers. One or more of the receivers can be mounted on the surface, such as bonding, frictional, and/or adhesive attachment, among others. In some embodiments, one or more of the receivers can be integrated into the surface, such as by forming the housing 236 around at least a portion of the receivers or by forming the receivers and housing 236 together, among others.

Figure 3A:
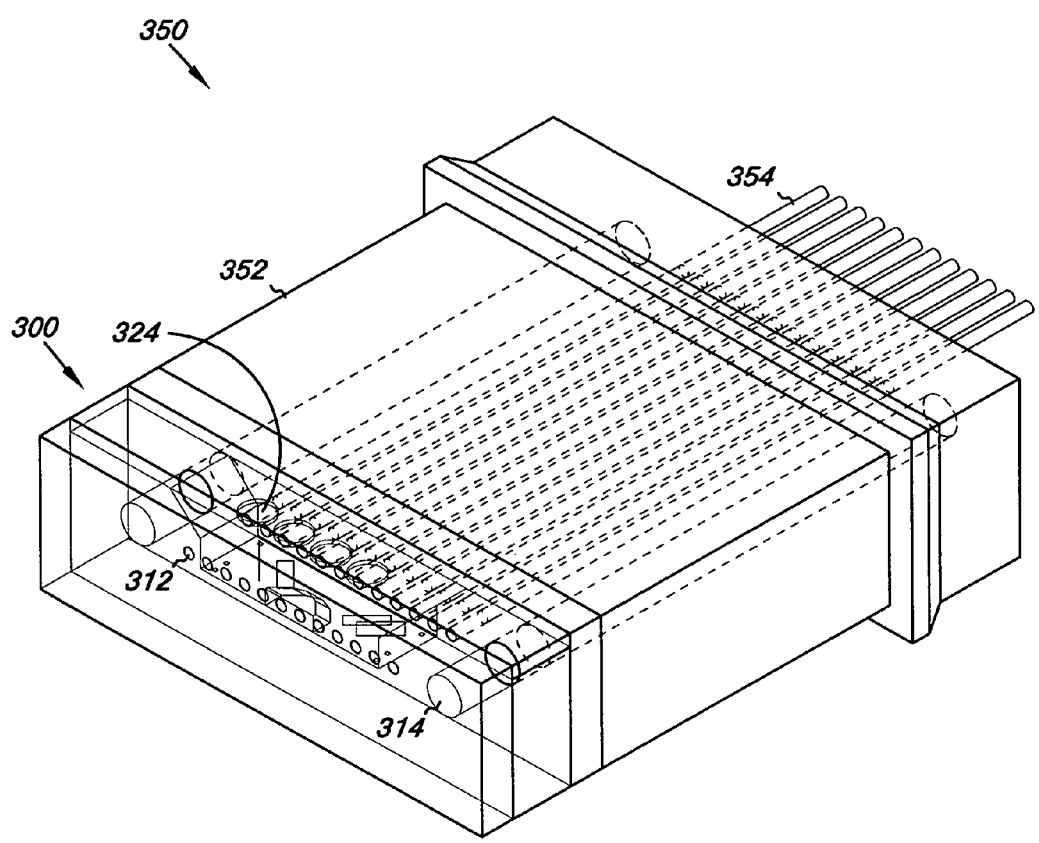
FIG. 3A is a top perspective illustration of an optoelectric power source embodiment attached to a ferrule.

FIG. 3A is a top perspective illustration of an optoelectric power source embodiment attached to a ferrule. In this embodiment, an optoelectric power source 300 is provided with a ferrule 350. In the embodiment shown, the optoelectric power source 300 is positioned adjacent to the ferrule 350.

In such embodiments, the optoelectric power source can be fixed to the ferrule or positioned against the ferrule, but not attached thereto. Attachment can be accomplished by mechanical fasteners, bonding, and/or through the use of adhesives, to name a few methods.

The two components (e.g., 300 and 350) can be attached together, for example, a number of alignment pins can be inserted into the apertures 314 in the embodiment illustrated in FIG. 3A. In various embodiments, an optoelectric power source and ferrule such as optoelectric power source 300 and the ferrule 350 can be formed together, thereby providing attachment such as by a unitary housing. By fixing the optoelectric power source and the ferrule together, the optical pathways formed within each structure (such as that shown at 312) can be fixedly aligned.

In the embodiment shown in FIG. 3A, the ferrule 350 includes a ferrule body 352 having the ends of a number of optical fibers 354 (in this example, twelve fibers) positioned therein. In this embodiment, the middle four fibers (fifth through eighth fibers if counting from an end of the array of fibers) are used to provide light to the optoelectric components.

As such, the prism is positioned to redirect the light from the four middle fibers through use of a number of angled facets (in this case four, one for each light source). As discussed above, the redirecting of the light can be provided by a number of different types of structures. For example, the use of a number of prisms and/or mirrors are two such suitable structures.

Further, the redirecting structures may be movable as discussed above to allow light to be selectively redirected by moving one or more redirecting structures into and out an optical pathway through which light is traveling. An optical pathway is the path in which light is traveling and may be bounded, such as by sidewalls of an optical fiber, or may be unbounded, such as light passing through space and/or air.

The light from each source can then be redirected toward a target (e.g., photo-voltaic receiver pads 324). However, the facets can be oriented such that the light is redirected to any number of targets. The use of multiple targets may increase the amount of light and/or electricity that can be received and/or produced, and is therefore beneficial, in some embodiments.

Figure 3B:
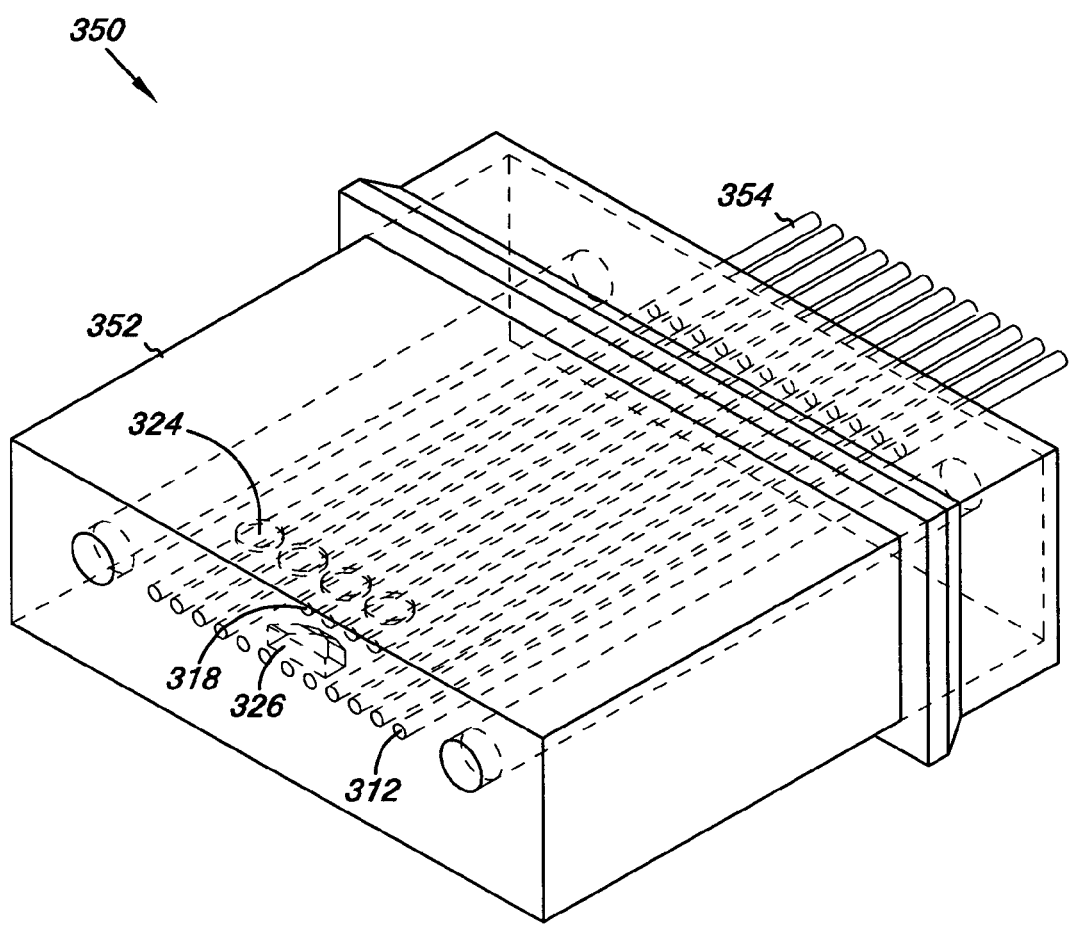
FIG. 3B is a top perspective illustration of a ferrule embodiment.

FIG. 3B is a top perspective illustration of a ferrule embodiment. In this embodiment, the optoelectric power source functionality is incorporated into the housing 352 of a ferrule 350. This embodiment also includes twelve optical fibers 354 positioned within the ferrule housing 352.

In the illustrated embodiment of FIG. 3B, the prism 326 is positioned within the ferrule housing 352 such that it redirects light from the four middle optical fibers 354. The light is redirected to a number of targets (e.g., photo-voltaic receiver pads 324 positioned within the ferrule housing 352.

Circuitry can be provided to convert the light into power and/or to provide the power to electrical components within the ferrule housing 352 and/or other components of the optical network. The circuitry can be provided within the ferrule housing 352 and/or outside the ferrule housing 352.

Light passing out of a fiber in one of apertures 318 that is not redirected can be passed through aperture 312. Lenses and other optical components can be provided at and/or proximate to aperture 312. The ferrule 350 can be aligned such that the light emitted from aperture 312 can be passed into another component, such as another ferrule having a number of optical fibers, for example.

Figure 4:
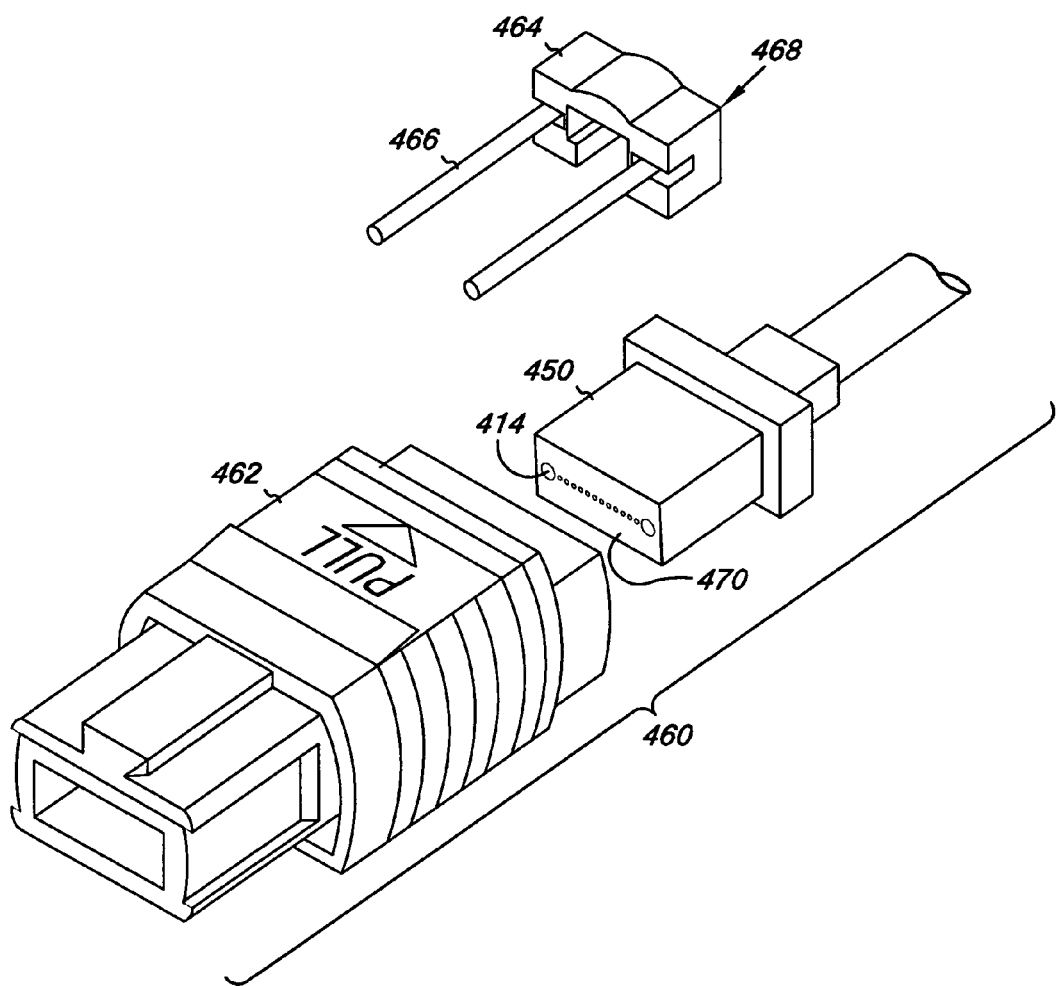
FIG. 4 is an exploded view of a portion of an optical network embodiment.

FIG. 4 is an exploded view of a portion of an optical network embodiment. In this embodiment, a portion of an optical network 460 is illustrated that includes a ferrule embodiment of the present disclosure 450, an electrical component 464, and a connector 462 for connecting the ferrule 450 to one or more other components, such as another ferrule or another component of the optical network.

In this embodiment, the ferrule 450 is attached to the electrical component 464 (e.g., a testing component having movable mirrors for redirecting light back down an optical pathway section or into another optical pathway section) by positioning pins 466 into apertures 414. Pins 466 and apertures 414 can also be used to provide alignment for a number of optical network components.

The power provided by the optoelectric power source within ferrule 450 can provide the power through circuitry positioned inside and/or outside the components 450, 462, and/or 464. For example, electrical contacts can be provided on the surface 470 of the ferrule 450 and surface 468 of the electrical component 464. In such embodiments, the components 450 and 464 can be aligned to complete an electrical connection between the electrical contacts on the surfaces 468 and 470 and thereby pass power from the component 450 to component 464.

The connector 462 can be used to house one or more optical components, such as electrical component 464 and one or more ferrules, such as ferrule 450. The connectors can be used to provide protection to the components, provided stability for the alignment of the optical components, and various other suitable functions. The pins 466 and apertures 414 can be used to align the contacts on the surfaces 468 and 470 such that the electrical connection is formed and can be used to maintain the electrical connection in the field.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A ferrule, comprising:
   a number of optical fibers each having an end;
   an optoelectric power source to convert light traveling through at least one of the optical fibers into electricity, wherein the number of optical fibers include a number of first optical fibers to provide light to the optoelectric power source and a number of second optical fibers to be used as an optical pathway to communicate light signals; and
   a component positioned in the ferrule to change the light signals being transmitted through the optical pathway, where the optoelectric power source provides power to the component.

2. The ferrule of claim 1, wherein the optoelectric power source is positioned to receive light exiting the end of at least one optical fiber.

3. The ferrule of claim 1, where the optoelectric power source includes an item to direct light from at least one optical fiber to a target, the item selected from the group consisting of a number of prisms and a number of mirrors.

4. A ferrule, comprising:
   a number of optical fibers each having an end; and
   an optoelectric power source to convert light travelling through at least one of the optical fibers into electricity to provide power to a component, where the optoelectric power source includes an item to direct light from at least one optical fiber to a target, the item selected from the group consisting of a number of prisms and a number of mirrors.

5. A ferrule, comprising:
a number of optical fibers each having an end;
an optoelectric power source to convert light travelling through at least one of the optical fibers into electricity; and
a component positioned within the ferrule to change a light signal being transmitted through an optical pathway, where the optoelectric power source provides power to the component.

6. The ferrule of claim 5, wherein the component is a movable mirror.

7. An optical pathway, comprising:
a first ferrule having;
a number of first optical fibers each having an end; and
an first optoelectric power source to convert light traveling through at least one of the first optical fibers into electricity to provide power to a first component; and
a first engagement surface; and
a second ferrule formed around at least a portion of a number of second optical fibers wherein the second ferrule includes a second engagement surface; and
wherein the first and second engagement surfaces are positioned to allow for the transmission of light signals between at least one of the number of first optical fibers and the second optical fibers.

8. The optical pathway of claim 7, wherein the first component is positioned between the first and second engagement surfaces.

9. The optical pathway of claim 7, wherein the second ferrule includes a second optoelectric power source to convert light traveling through at least one of the optical fibers into electricity to provide power to the first component.

10. The optical pathway of claim 7, wherein the second ferrule includes a second optoelectric power source to convert light traveling through at least one of the optical fibers into electricity to provide power to a second component.

11. The optical pathway of claim 7, wherein the first optoelectric power source provides power to a second component.

12. The optical pathway of claim 10, wherein the second component is positioned on the second ferrule.

13. An optoelectric power source, comprising:
a receiver component to receive light from an optical fiber, where the component is provided within a ferrule;
an item to direct light from the optical fiber to a target, where the target receives the light, and where the item is selected from the group consisting of a number of prisms and a number of mirrors; and
an optoelectric converter to convert the light received by the target into electricity.

14. The optoelectric power source of claim 13, wherein the optoelectric power source is positioned to receive light exiting an end of at least one optical fiber.

15. The optoelectric power source of claim 13, wherein the number of optical fibers include a number of first optical fibers to provide light to the optoelectric power source and a number of second optical fibers to be used as an optical pathway to communicate light signals.

16. The optoelectric power source of claim 13, wherein the optoelectric power source includes a prism to direct light from at least one optical fiber to a target.

17. The optoelectric power source of claim 13, wherein the optoelectric power source includes a number of mirrors to direct light from at least one optical fiber to a target.

18. The optoelectric power source of claim 13, wherein the component is a movable mirror.

* * * * *